(12) United States Patent
Garnier et al.

(10) Patent No.: US 10,003,202 B2
(45) Date of Patent: Jun. 19, 2018

(54) DEVICE FOR BALANCING A POWER BATTERY ELEMENT LOAD

(71) Applicants: COMMISSARIAT A L'ENERGIE ATOMIQUE ET AUX ENERGIES ALTERNATIVES, Paris (FR); RENAULT s.a.s., Boulogne-billancourt (FR)

(72) Inventors: Laurent Garnier, Marennes (FR); Daniel Chatroux, Teche (FR); Marc Lucea, Boulogne-billancourt (FR); Pierre-Emmanuel Ory, Meythet (FR)

(73) Assignees: COMMISSARIAT À L'ÉNERGIE ATOMIQUE ET AUX ÉNERGIES ALTERNATIVES, Paris (FR); RENAULT s.a.s., Boulogne-billancourt (FR)

(*) Notice: Subject to any disclaimer, the term of this patent is extended or adjusted under 35 U.S.C. 154(b) by 39 days.

(21) Appl. No.: 15/100,190

(22) PCT Filed: Nov. 28, 2014

(86) PCT No.: PCT/FR2014/053087
§ 371 (c)(1),
(2) Date: May 27, 2016

(87) PCT Pub. No.: WO2015/079188
PCT Pub. Date: Jun. 4, 2015

(65) Prior Publication Data
US 2017/0264109 A1   Sep. 14, 2017

(30) Foreign Application Priority Data
Nov. 29, 2013   (FR) ...................................... 13 61819

(51) Int. Cl.
*H02J 7/00*   (2006.01)
*H02M 7/217*   (2006.01)
(Continued)

(52) U.S. Cl.
CPC .......... *H02J 7/0014* (2013.01); *H02J 7/0052* (2013.01); *H02M 7/217* (2013.01); *H02M 7/537* (2013.01);
(Continued)

(58) Field of Classification Search
CPC ...................................................... H02J 7/0014
(Continued)

(56) References Cited

U.S. PATENT DOCUMENTS

| 5,666,041 A | 9/1997 | Stuart et al. | |
| 2010/0295510 A1* | 11/2010 | Moussaoui | H02J 7/0016 320/118 |

(Continued)

FOREIGN PATENT DOCUMENTS

| EP | 2 276 140 A2 | 1/2011 |
| EP | 2 320 537 A2 | 5/2011 |

(Continued)

OTHER PUBLICATIONS

International Search Report and Written Opinion issued Apr. 20, 2015 in PCT/FR2014/053087 filed Nov. 28, 2014 (with English language translation).

*Primary Examiner* — Edward Tso
*Assistant Examiner* — Ahmed Omar
(74) *Attorney, Agent, or Firm* — Oblon, McClelland, Maier & Neustadt, L.L.P.

(57) ABSTRACT

A device for balancing load of a storage device including plural elements connected in series. The device includes: a DC/AC converter including an inverter and a series resonant circuit connected to the output of the inverter; plural AC/DC
(Continued)

converters, each including an input and an output that is connected to one of the respective storage elements and selectively supplies power to the output thereof; a transformer, the main winding of which is connected to the series resonant circuit and the secondary winding of which has outputs connected to an input of a respective AC/DC converter; and a control circuit configured to control the DC/AC converter at the current source when a number of outputs supplied with power is no higher than a threshold and moreover configured to control the DC/AC converter at a constant power when the number of outputs supplied with power is greater than the threshold.

10 Claims, 5 Drawing Sheets

(51) Int. Cl.
*H02M 7/537* (2006.01)
*H02M 7/48* (2007.01)

(52) U.S. Cl.
CPC ............... *H02J 2007/0059* (2013.01); *H02M 2007/4815* (2013.01)

(58) Field of Classification Search
USPC .......................................................... 320/116
See application file for complete search history.

(56) References Cited

U.S. PATENT DOCUMENTS

2011/0115436 A1   5/2011   Zhang et al.
2015/0137736 A1*  5/2015   Lucea ................. B60L 11/1866
                                              320/104

FOREIGN PATENT DOCUMENTS

KR    10-2007-0111587 A    11/2007
WO    WO 2013/171416 A1    11/2013

* cited by examiner

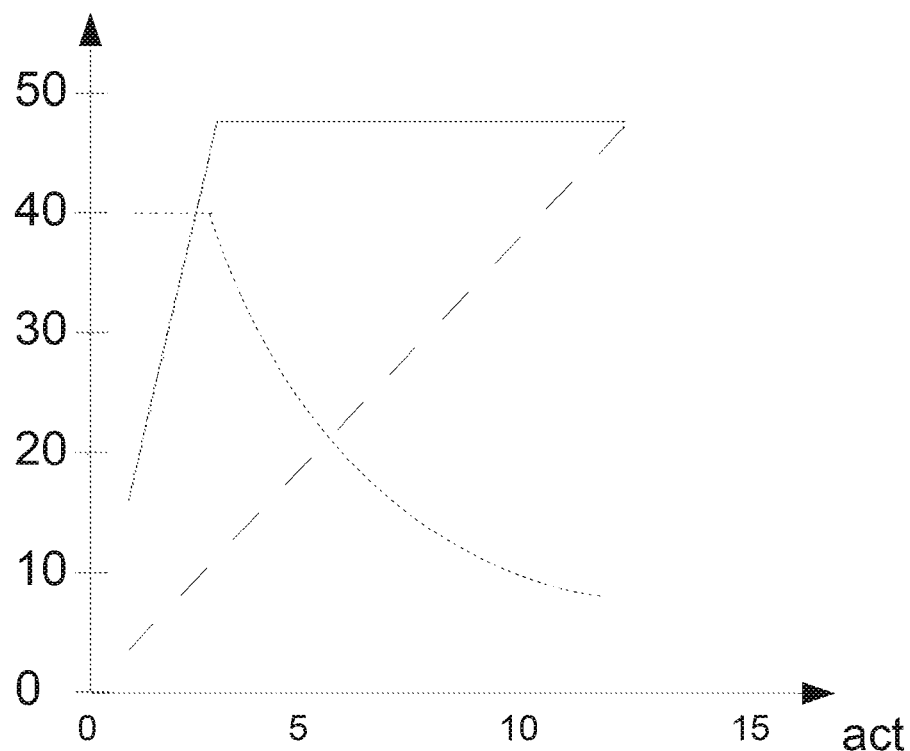
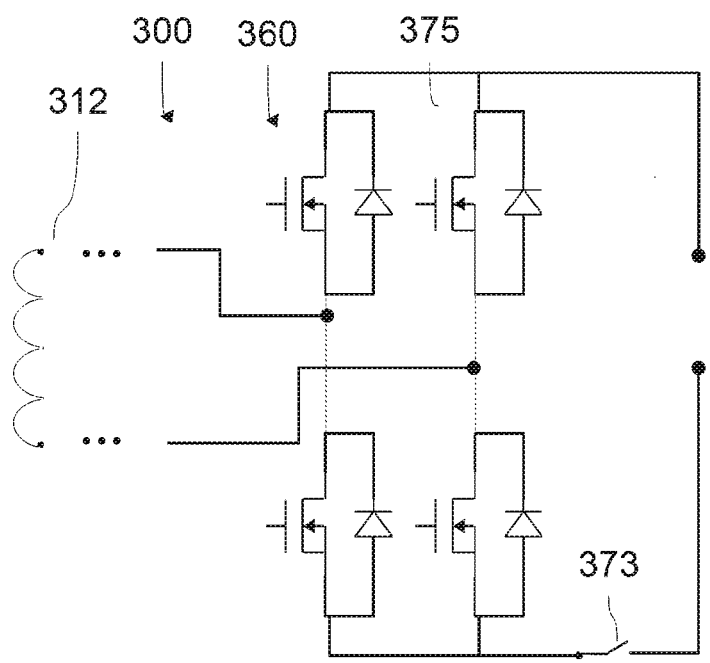

DEVICE FOR BALANCING A POWER BATTERY ELEMENT LOAD

The invention relates to a charge balancing device for a power battery comprising electrochemical accumulators.

High-power, direct-voltage electrical systems are undergoing significant development. In fact, many transport systems include a direct-voltage power supply.

Hybrid internal combustion/electric vehicles or electric vehicles include, in particular, high-power batteries. Batteries of this type are used to drive an alternating-current electric motor via an inverter. The voltage levels necessary for motors of this type reach several hundreds of Volts, typically in the region of 400 Volts. Batteries of this type also comprise a high capacity in order to improve the autonomy of the vehicle in electric mode.

In order to obtain high power and capacity, a plurality of groups of accumulators are placed in series. The number of stages (number of accumulator groups) and the number of accumulators in parallel in each stage vary as a function of the voltage, current and capacity required for the battery. The combination of a plurality of accumulators is referred to as an accumulator battery. The electrochemical accumulators used for vehicles of this type are generally lithium ion accumulators for their capacity to store a substantial amount of energy with a contained weight and volume. The technologies of lithium ion iron phosphate LiFePO4 batteries have undergone substantial developments due to a high intrinsic safety level, at the expense of a slightly reduced energy storage density. An electrochemical accumulator usually has a nominal voltage in the region of:

3.3 V for a lithium ion iron phosphate technology, LiFePO4, 4.2 V for a cobalt-oxide-based lithium ion technology.

The invention can also be applied to super-capacitors.

The charging or discharging of an accumulator results respectively in an increase or decrease in the voltage on its terminals. An accumulator is considered to be charged or discharged when it has reached a voltage level defined by its electrochemical process. In a circuit using a plurality of accumulator stages, the current flowing through the stages is the same. The level of charge or discharge of the stages therefore depends on the intrinsic characteristics of the accumulators. Voltage differences between the stages appear during charging or discharging due to disparities of manufacture, ageing, assembly and operating temperature between the different accumulators.

For an Li-ion technology accumulator, an excessively high or low voltage, referred to as the threshold voltage, can damage or destroy said accumulator. For example, the overcharging of a cobalt-oxide-based Li-ion accumulator may cause its thermal runaway and an outbreak of fire. For an iron-phosphate-based Li-ion accumulator, an overcharging results in a breakdown of the electrolyte which reduces its service life or damages it. An excessive discharging which results in a voltage below 2 V, for example, mainly causes an oxidization of the current collector of the negative electrode when the latter is made from copper and therefore damages the accumulator. Consequently, the monitoring of the voltage on the terminals of each accumulator stage is obligatory during charging and discharging for reasons of safety and reliability. A monitoring device is thus generally disposed in parallel with each stage and performs this function.

The function of the monitoring device is to monitor the state of charge (or the residual charge) and discharge of each accumulator stage and to transmit the information to the control circuit in order to stop the charging or discharging of the battery when a stage has reached its threshold voltage. However, on a battery with a plurality of accumulator stages disposed in series, if charging is stopped when the most-charged stage reaches its threshold voltage, the other stages may not be fully charged. Conversely, if discharging is stopped when the most-discharged stage reaches its threshold voltage, the other stages may not be fully discharged. The capacity of each accumulator stage is therefore not exploited, which represents a major problem in transport applications, with on-board batteries having severe autonomy constraints. The useful capacity of the battery is in fact reduced by the interruption of the discharging of the battery when stages are not yet fully discharged. Indirectly, the useful kWh cost increases, as does the weight and volume of the pack. In order to overcome this problem, the monitoring device is generally combined with a charge balancing device.

The function of the balancing device is to optimize the charge and therefore the autonomy of the battery by bringing the accumulator stages disposed in series to an identical state of charge and/or discharge. Two categories of balancing device exist, namely energy-dissipation or energy-transfer balancing devices.

With energy-dissipation balancing systems, the voltage on the terminals of the stages is equalized by diverting all or part of the charging current from one or from the stages having reached the threshold voltage and by dissipating the energy in a resistor. Alternatively, the voltage on the terminals of the stages is equalized by discharging one or the stages having reached the high threshold value.

However, energy-dissipation balancing systems of this type have the major disadvantage of consuming more energy than is necessary in order to charge the battery. In fact, a plurality of accumulators must be discharged or the charging currents of a plurality of accumulators must be diverted so that the last, slightly less charged accumulator(s) end their charging. The dissipated energy can therefore be higher than the energy of the charge(s) remaining to be implemented. Furthermore, they dissipate the surplus energy in heat, which is not compatible with the integration constraints in transport and on-board applications, and which causes a substantial decrease in the service life of the accumulators when the temperature rises.

Energy-transfer balancing systems for their part exchange energy between accumulator stages or with an auxiliary energy network. The balancing time is a key factor for the efficiency of the balancing. Consequently, a relatively high charging power may be desired.

The energy transfer can take place either unidirectionally, from the battery to the stages or from the stages to the battery, or bidirectionally from the battery to the stages and from the stages to the battery or from one adjacent stage to another.

Document WO2011095608 describes an example of a charge balancing device for a battery. In this example, the charge balancing device comprises a unidirectional converter with a plurality of outputs. The converter comprises a dedicated charging device for each of its outputs. Each stage can thus be charged independently during the balancing. The converter furthermore comprises a voltage generator receiving an auxiliary battery voltage on its input and applying its output voltage to each dedicated charging device. The voltage generator notably includes a full bridge with four switches, the voltage of which is applied to the primary of a transformer. The secondary of the transformer is connected to apply its voltage to the input of each charging device. The balancing current of a stage is mainly limited by the dimensioning of the components of its charging device.

However, a charge balancing device of this type has disadvantages. This device has, in particular, a somewhat limited charging power and is therefore unsuitable when a substantial imbalance exists between the stages. The electric power applied to the primary of the transformer is in fact spread over a plurality of charging devices.

Furthermore, the obtaining of the state of charge of each stage requires a precise measurement of the charging energy supplied by each charging device and requires measurements of the current and voltage on the secondary of the transformer. Measurements of this type incur an additional cost for the balancing device which is incompatible with most applications.

Document US20010115436 describes another example of a charge balancing device for a battery. The charges or discharges of the different stages are implemented here in a sequential manner. The charge balancing device comprises an isolated bidirectional converter. The bidirectional converter comprises a matrix of transistors in such a way that the charging voltage and current are applied selectively to only one single stage simultaneously. The converter furthermore includes a transformer, the primary of which is supplied with power by an auxiliary battery and the secondary of which is connected to the input of the matrix of transistors.

A charge balancing device of this type also has disadvantages. For a relatively uniform imbalance, the balancing time is quite long due to the relatively reduced charging power and the number of stages to be balanced. If the converter is dimensioned to supply a higher charging current, the heat loss then becomes excessive. This device incurs a substantial cost and has a rather low electricity yield, especially when the voltage of the stages is relatively low (or then requires even more costly components).

The invention aims to resolve one or more of these disadvantages. The invention thus relates to a charge balancing device of an electrical energy power storage device, as defined in the attached claims.

Other characteristics and advantages of the invention will become clearly evident from the description which follows, by way of indication and in no way limiting, with reference to the attached drawings, in which:

FIG. 6 is a diagram comparing the power supplied by different charge balancing devices as a function of the number of simultaneously charged storage elements;

FIG. 7 is an electrical diagram of a variant of a rectifier circuit for synchronous rectification of the AC/DC converter;

Figure 1:
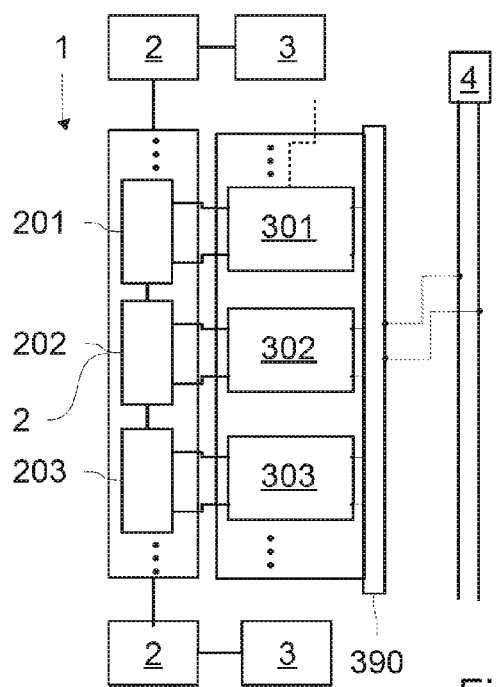
FIG. 1 shows a schematic representation of an example of an electrical power supply system including a charge balancing device implementing the invention.
Figure 2:
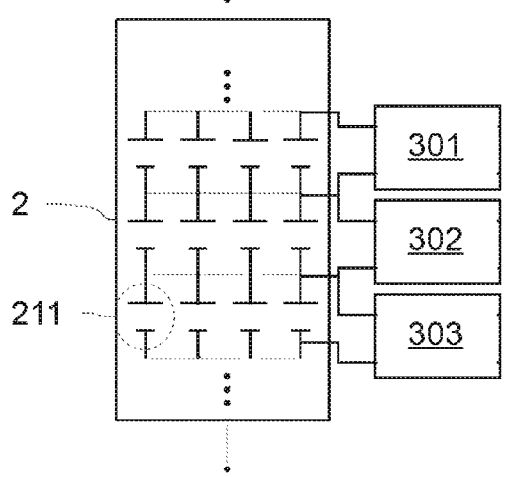
FIG. 2 shows an example of a stage of accumulators of an electrical power supply system capable of being subjected to a charge balancing.

FIG. 1 shows schematically an example of an electrical power supply system 1. The electrical power supply system 1 includes, on the one hand, an electrical energy storage system in the form of series-connected power batteries 2. Each battery 2 includes a plurality of stages connected in series between its terminals. A battery 2 shown in FIG. 1 comprises, in particular, stages 201, 202 and 203 connected in series. The voltage between the positive terminal and the negative terminal of the electrical energy storage system (on the terminals of the group of series-connected batteries 2) is typically between 100 V and 750 V, for example in the region of 400 V. The electrical energy storage system is, for example, intended to supply an electrical load (not shown) such as the motor of a hybrid or electric vehicle by being connected to the terminals of an inverter, and is advantageously isolated from the metal chassis of such a vehicle. As shown in FIG. 2, each battery 2 may include a plurality of electrochemical accumulators 211 connected in parallel in a plurality of branches and/or connected in series in a plurality of stages.

Furthermore, the electrical power supply system 1 includes a charge balancing device 3 for each energy-transfer battery 2. The charge balancing device 3 shown includes a connection interface configured to be connected to the terminals of each of the stages of the battery 2. The charge balancing device 3 also includes a connection interface 390 configured to be connected to a direct-voltage source, for example via an auxiliary network 4, for example an electrical network on-board a vehicle, the voltage of which is generally regulated to a value close to 12 V. This regulated voltage may, for example, vary within a range between 10.5 V and 14 V, generally by using an auxiliary battery, a super-capacitor or a capacitor connected to this on-board network 4. This regulated voltage of the network 4 is less than the voltage on the terminals of the battery 2 (for example at least five times less). Auxiliary loads are normally connected to the auxiliary network 4.

The balancing device 3 comprises a plurality of AC/DC converters, the output of each of these converters being connected to a respective stage. In this case, the converters 301 to 303 have their respective output connected to the terminals of the stages 201 to 203 respectively. The converters 301 to 303 are advantageously intended to perform the balancing of the stages 201 to 203 of the battery 2 (and thus optimize the charge of this power battery 2).

Figure 3:
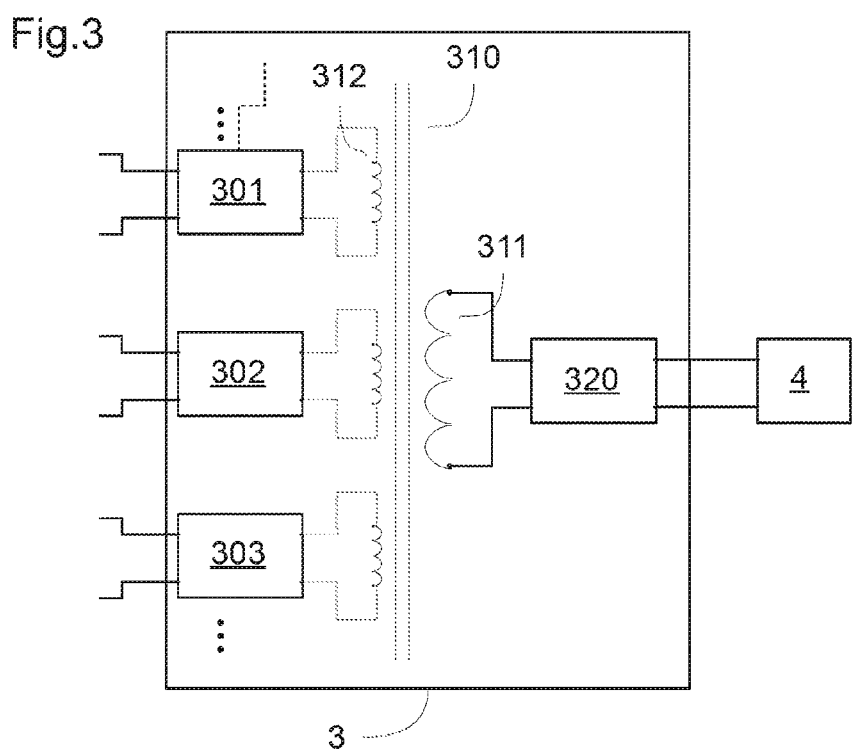
FIG. 3 shows schematically a charge balancing device.

More precisely, in the example shown with reference to FIG. 3, the charge balancing device 3 comprises:
 a transformer 310;
 a DC/AC converter 320, the input of which is connected to the on-board network 4, and the output of which is connected to the primary 311 of the transformer 310;
 the AC/DC converters 301 to 303, the outputs of which are intended to be connected to the stages 201 to 203 respectively, and the inputs of which are connected to respective outputs 312 of the secondary of the transformer 310;
 a control circuit described later.

Due to the use of a transformer 310, the converters 301 to 303 are isolated in relation to the on-board network 4 and in relation to the DC/AC converter 320. The secondary of the transformer 310 includes independent secondary windings dedicated to respective converters 301 to 303. The converters 301 to 303 are thus isolated from one another. The transformer 310 also enables the voltage level applied to the input of each of the converters 301 to 303 to be adapted in a manner known per se.

The function of the charge balancing device 3 is, in particular, to transfer energy between an on-board network 4 and a plurality (or even a large number) of stages of the battery 2. The transformer 310 thus implements a transformer between the primary 311 and a large number of secondary windings, dedicated to respective AC/DC converters (and therefore dedicated to respective stages).

Figure 4:
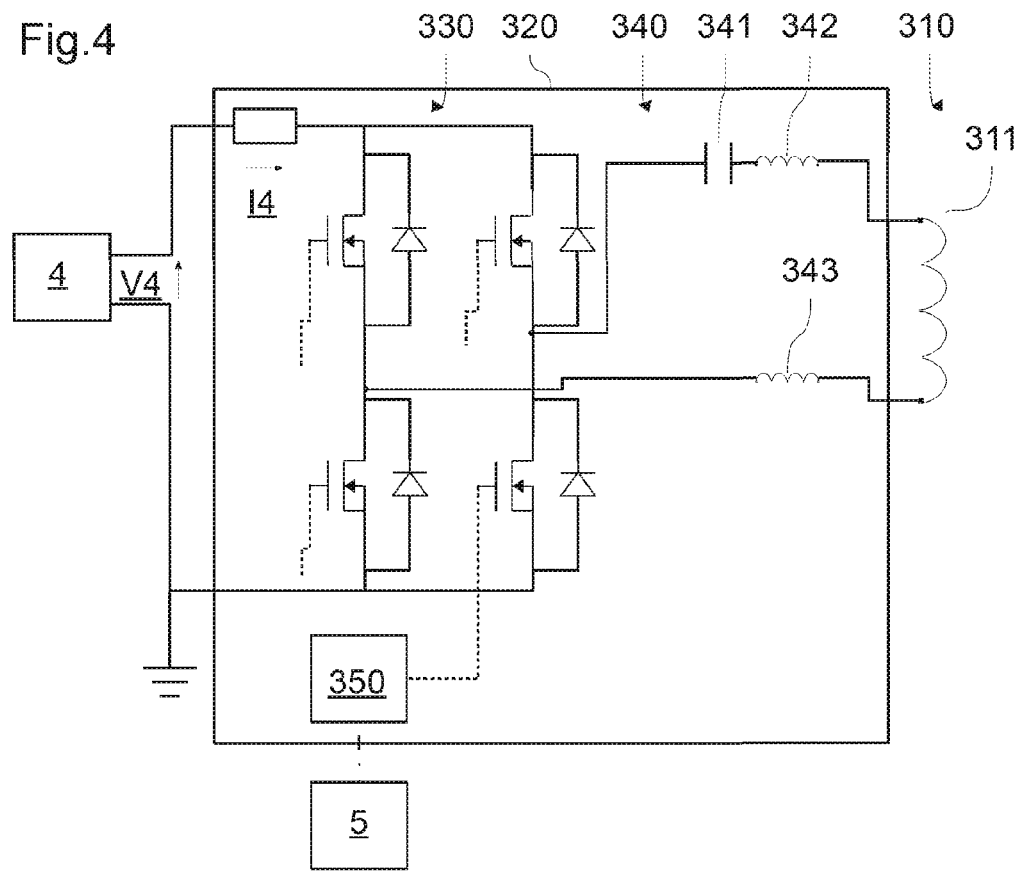
FIG. 4 is an electrical diagram of an example of a DC/AC converter of the charge balancing device.

FIG. 4 is an electrical diagram of an example of a DC/AC converter 320 of the charge balancing device 3. The auxiliary network 4 is connected to the input of the DC/AC converter 320 to apply a voltage to it and supply it with a current. The converter 320 includes an inverter 330. Here, the inverter 330 has a bridge chopper structure known per se. The inverter 330 includes transistor chopper components. The transistors are controlled by a control circuit 350 in order to transform the direct voltage supplied by the network 4 into an alternating voltage applied to the output of the inverter 330. The control circuit 350 is itself controlled by a control circuit 5.

A resonant circuit 340 is connected to the output of the inverter 330, i.e. at the output of the bridge arm of this inverter 330. Here, the series resonant circuit 340 comprises a capacitor 341, an inductor 342 and an inductor 343. The series resonant circuit 340 is connected in series with the primary 311 of the transformer 310.

An example of the dimensioning of the resonant circuit 340 may be as follows:
- a power value to be transmitted to the secondary of the transformer 310, for example a value Pout=48 W, is defined in advance;
- a minimum input voltage Emin is determined for the AC/DC converter 320, for example Emin=11V for a 12 V network 4, the voltage of which is regulated between 11 and 13 V;
- an efficiency of the DC/AC converter 320 of 85% is assumed;
- a minimum operating frequency fr of 220 kHz is set, linked to the technology of the control circuits and the type of semiconductors that are used;
- an operation of the converter 320 at a frequency higher than a resonance frequency f0, where f0 is chosen to have a value, for example, of 200 kHz, is chosen;
- an overvoltage factor applicable to the capacitor 341 is determined. This criterion varies as a function of the technology of this capacitor 341 and the operating frequency. With a COG ceramic capacitor, this overvoltage factor has a value of approximately 1, for example 1.075;
- a maximum output voltage Voutmax=4V is set on the terminals of a stage.

A total inductance of 2879 nH calculated for the combination of the inductors 342 and 343, and a capacitance value of 220 nF for the capacitor 341 then enable, for example, the desired resonance frequency f0 to be obtained.

A simple transformation ratio m such that m*Emin>Voutmax can be chosen between the primary 311 and each output of the secondary 312. However, the more the distance from the ratio m*Emin=Voutmax increases, the more the conversion efficiency decreases. A compromise may result in a choice of m=0.5.

The combination of the inverter 330 with the series resonant circuit 340 and the control circuit 5 enables the DC/AC converter 320 to operate selectively:
- in a power source or alternating current source operating mode at a staged level as a function of the number of outputs supplied with power, which will be referred to as a staged-level operating mode;
- in another operating mode, in such a way that the latter operates at constant power independently from the number of outputs supplied with power, which will be referred to as a constant-level operating mode.

In the staged-level power source operating mode, the power and the current applied to the primary of the transformer 310 and therefore the power transmitted to the stages are easily controlled.

The control circuit 5 switches between the staged-level operating mode and the constant-level operating mode according to the following criteria:
- if the number act of AC/DC converters 300 having to supply their respective output simultaneously with power is less than or equal to a threshold nt, the control circuit 5 causes the converter 320 to operate in such a way as to regulate its output power Pcc (or in such a way as to regulate its output current Icc). The power setpoint Pcc of the converter 320 is then Pcc=act*Pinc, where Pinc is a constant. Pinc is, for example, the unit power that the converter 320 must supply so that a single converter 300 receives a nominal charging power on a stage 200 (the power supplied by the converter 320 to the primary of the transformer 310 being equal to the sum of the powers supplied to the selected stages, assuming a transformation ratio of 1 and an efficiency of 100% for the converters 300). Alternatively, a current setpoint Icc of the converter 320 is then Icc=act*Iun (still assuming a transformation ratio of 1 and an efficiency of 100% for the converters 300), where Iun is the current that the converter 320 must deliver so that a single converter 300 applies the nominal charging current to a stage 200;
- if the number act of AC/DC converters 300 having to supply their respective output simultaneously with power is greater than the threshold nt, the control circuit 5 causes the converter 320 to operate with a constant-level power regulation, independently from the number act of converters. The charging current of the simultaneously recharged stages 200 is then less than their nominal charging current.

The threshold nt may, for example, be determined in the following manner. Pout is assumed to be the maximum power that the converter 320 can supply to the primary of the transformer 310, and Pinc is a power to be applied to the primary which a single converter 300 applies its maximum power to its output (an efficiency of 100% for the converters 300 is assumed by way of simplification). The operating modes are then determined according to the following rules:
- if act*Pinc≤Pout, the control circuit 5 causes the converter 320 to operate in staged-level mode supplying the power Pcc=act*Pinc to the primary;
- if act*Pinc>Pout, the control circuit 5 causes the converter 320 to operate in constant-level mode. The threshold nt is therefore the greatest value of act for which the relationship act*Pinc≤Pout is verified.

The operating modes can also be determined according to the following rules on the primary:
- if act*Psec≤Ppr, (where Ppr is the maximum power that the converter 320 can supply to the secondary of the transformer 310, and Psec is the maximum power that each converter 300 can apply to its output), the control circuit 5 causes the converter 320 to operate in staged-level mode supplying the total power Pch Pch=act*Pun (where Pun is a constant, corresponding to a power which it is desired to apply to a selected stage) applied to the different selected stages. If Pun=Psec, a power equal to act*Psec is supplied to the secondary of the transformer;

if act*Psec>Ppr, the control circuit 5 causes the converter 320 to operate in constant-level mode. The threshold nt is therefore the greatest value of act for which the relationship act*Psec≤Ppr is verified.

Thus, according to the invention, the cooling of the converter 320 may remain dimensioned for a relatively reduced power, while benefiting from an optimized charge balancing time for the battery 2. Similarly, the dimensioning of the transformer 310 can be adapted to this relatively reduced power. By using a converter 320 with a relatively reduced power, heat loss which a higher-power converter would cause can be avoided. The operation of the converter 320 has an optimum energy efficiency, since it operates at its nominal power for a predominant time period corresponding to the constant-level operating mode. The transmitted energy is optimized at all times, the consequence of which is to reduce considerably the balancing times.

The dimensioning of the series resonator 340 is advantageously sufficiently reduced to obtain a contained cost. In particular, the inductor 342 of the series circuit 340 is dimensioned to limit the power Pout applied to the primary of the transformer 310 in such a way that Pout<n*Pinc, where n is the number of stages of the battery. For a given operating frequency and voltage, the characteristics of the inductor 342 (such as its inductance value) can easily be determined, allowing the power Pout that can be applied to the primary of the transformer to be limited.

The dimensioning of the secondary circuits is implemented in such a way that each secondary circuit (and, in particular, the rectifier circuit) can support the power applied by its secondary winding for a power Psec on the output of the converter 300. The rating of rectifier diodes in the full-wave rectifier circuit 360 is at least equal to the current flowing through the secondary circuit when the power Psec is applied to the corresponding stage.

Figure 5:
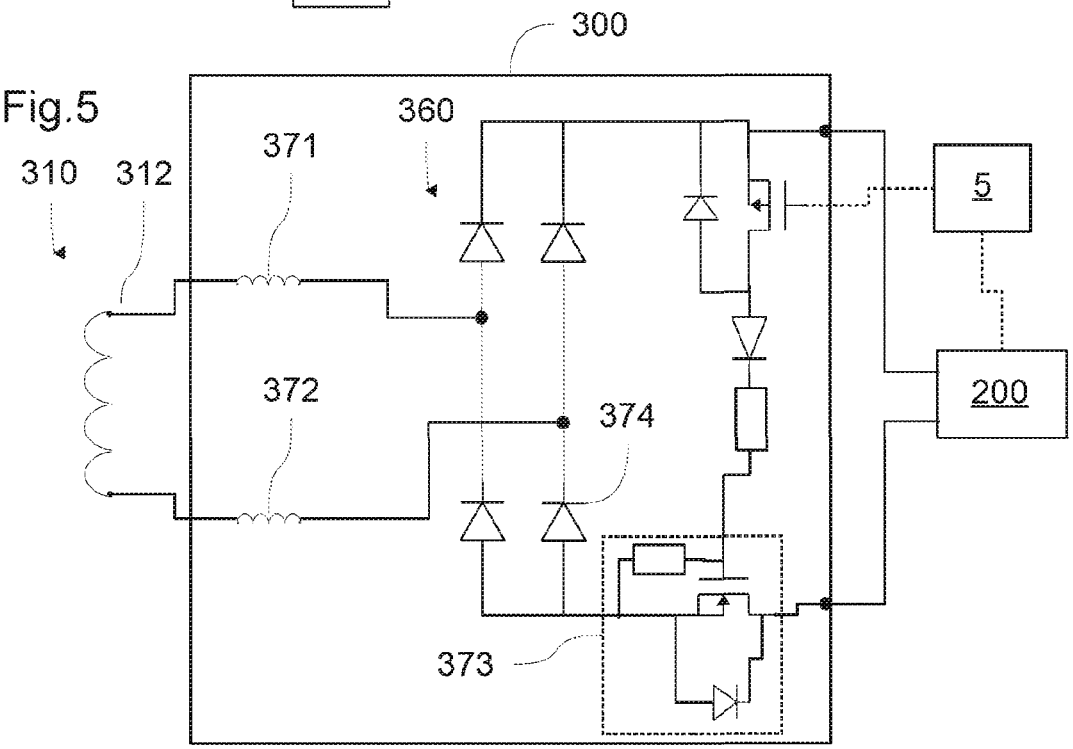
FIG. 5 is an electrical diagram of an example of an AC/DC converter of the charge balancing device.

FIG. 5 is an electrical diagram of an example of an AC/DC converter 300 of the charge balancing device 3. The converter 300 comprises an input connected to an output or a respective winding of the secondary 312 of the transformer 310. The input of the converter 300 is connected here as a bridge between four rectifier elements 374 of a rectifier circuit 360. Here, the rectifier elements 374 are diodes. A switch 373 is connected between the rectifier circuit 360 and the output of the converter 300. Here, the switch 373 includes a MOSFET transistor. This transistor 373 is controlled by the control circuit 5, via a control circuit (not shown). The switch 373 allows the selective interruption of the power supply of the output of the converter 300. The switch 373 thus allows the charge of the stage 200 connected to this output to be selectively controlled. All of the rectifier circuits 360 described in the examples are of the full-wave type. The advantage of full-wave rectifiers of this type in combination with the dimensioning of the inductors will be described in detail below.

The diagram shown in FIG. 6 highlights the charge balancing performance of an balancing device 3 according to the invention compared with other charge balancing devices designed according to the prior art. The dashed-line curve corresponds to a charge balancing device corresponding to the teaching of document WO2011095608. The dotted-line curve corresponds to the teaching of document US20010115436. The solid-line curve corresponds to a charge balancing device 3 according to one implementation of the invention.

In this diagram, the x-axis corresponds to the number act of AC/DC converters undergoing charge balancing. The y-axis corresponds to the total charge power or to a multiple of the total charging current supplied by each charge balancing device.

For the different charge balancing devices, it has been assumed that each of them is capable of supplying a power of 48 W at the output.

For the charge balancing device represented by the broken line, each output converter is dimensioned to supply a maximum charging current of 1 A under 4 V. The charging power is then proportional to the number of stages Act undergoing charging.

For the charge balancing device represented by the dotted line, it is noted that the mean charging power (since the charge of the different stages is sequential) is high for a reduced number of stages of which the charge is desired to be balanced. The mean charging power is then essentially limited by the dimensioning of the output converters. As soon as the number of stages of which the charge is desired to be balanced increases, the mean charging power falls rapidly.

The balancing device 3 according to the invention is based on the assumption of AC/DC converters each dimensioned to supply a charging current from their stage up to 4 A. The charging power is proportional to the number of stages undergoing simultaneous charging for the left part of the diagram, which corresponds to the staged-level operating mode of the DC/AC converter. The stage(s) undergoing simultaneous charging then benefit(s) from a relatively high charging current in order to proceed to a fast balancing phase (this operating mode corresponds more to a start of charge balancing). The charge power is constant and optimum for the right part of the diagram, which corresponds to the constant-level operating mode of the DC/AC converter (this operating mode corresponds more to an end of charge balancing). This charge balancing phase is also fast, since all the power made available by the DC/AC converter is exploited.

Each AC/DC converter 300 comprises at least one inductor connected between its input and its rectifier circuit 360. In the example shown in FIG. 5, the converter 300 comprises two inductive elements 371 and 372 connected between the input of the converter 300 and the rectifier circuit 360. This inductor is used to present a predominant value in relation to the parasitic connection inductances. Inductor dimensioning rules will be described in detail below.

When a plurality of converters 300 simultaneously supply their respective stages 200 with power, the current flowing in the primary of the transformer 311 is distributed in the windings of the secondary pro rata to the line impedances of these converters. By means of said inductors, the currents delivered by different AC/DC converters 300 simultaneously can be equalized.

FIG. 7 is an electrical diagram of a variant of an AC/DC converter 300 of the charge balancing device 3. The converter 300 comprises an input connected to a respective winding of the secondary 312 of the transformer 310. The input of the converter 300 is connected here as a bridge between four rectifier elements 375 of a rectifier circuit 360. Here, the rectifier elements 375 are switches based on MOSFET transistors. The rectifier circuit 360 performs synchronous rectification, the switching of said rectifier transistors being controlled by the control circuit 5 and by a control circuit (not shown).

A switch 373 is connected between the rectifier circuit 360 and the output of the converter 300. The switch 373 is controlled by the control circuit 5 in order to interrupt selectively the power supply of the output of the converter 300. The switch 373 thus allows the charge of a stage 200 connected to this output to be selectively controlled. The converter 300 also comprises an inductor (not shown) connected between its input and its rectifier circuit 360.

Figure 8:
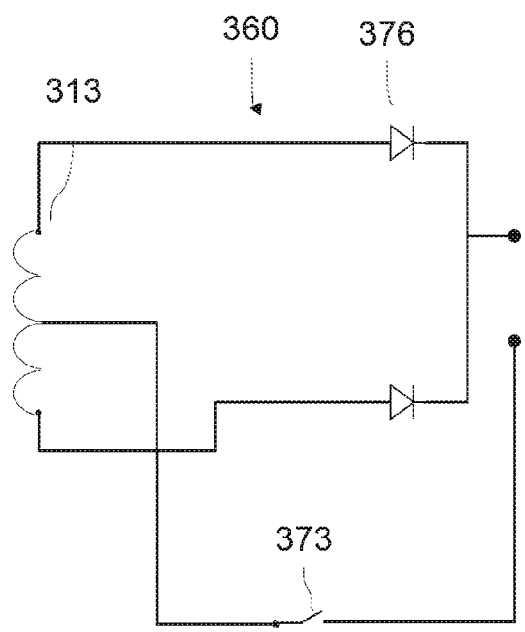
FIG. 8 is an electrical diagram of a first variant of a rectifier circuit connected to a secondary having a midpoint.

FIG. 8 is an electrical diagram of another variant of a rectifier circuit 360. The rectifier circuit 360 is connected to a secondary winding 313 at the midpoint of the transformer 310. Here, the rectifier elements 376 of the rectifier circuit 360 are diodes. Each diode is connected between, on the one hand, a respective terminal of the secondary winding 313, and, on the other hand, an output terminal of the AC/DC converter 300. The other output terminal of the AC/DC converter 300 is connected to the midpoint of the winding 313 via the switch 373.

Figure 9:
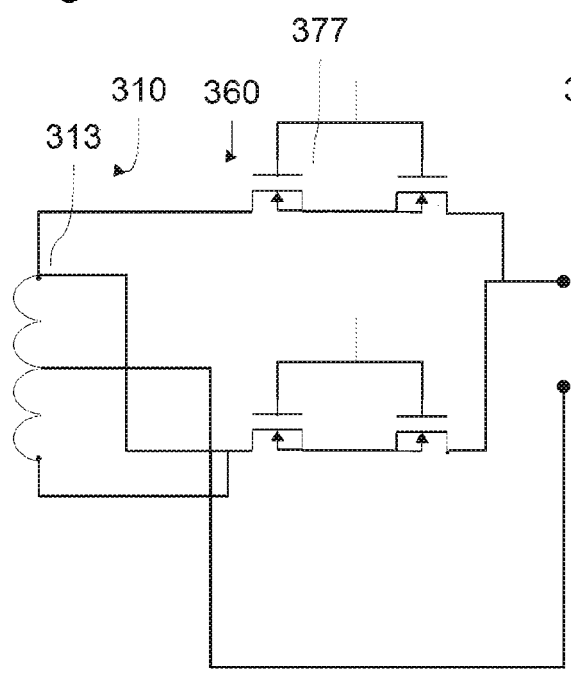
FIG. 9 is an electrical diagram of a second variant of a rectifier circuit connected to a secondary having a midpoint.

FIG. 9 is an electrical diagram of another variant of a rectifier circuit 360 of an AC/DC converter 300. The rectifier circuit 360 is connected to a secondary winding 313 at the midpoint of the transformer 310. Here, the rectifier circuit 360 is of the synchronous type. Here, the rectifier elements 377 of the rectifier circuit 360 include two-way switches, for example based on series-mounted MOSFET transistors. Each switch 377 is connected between, on the one hand, a respective terminal of the secondary winding 313, and, on the other hand, an output terminal of the AC/DC converter 300. The other output terminal of the AC/DC converter 300 is connected to the midpoint of the winding 313. The openings of the switches 377 can be controlled to interrupt selectively the power supply of the output of the AC/DC converter 300 and thus dispense with a dedicated switch for this function.

Figure 10:
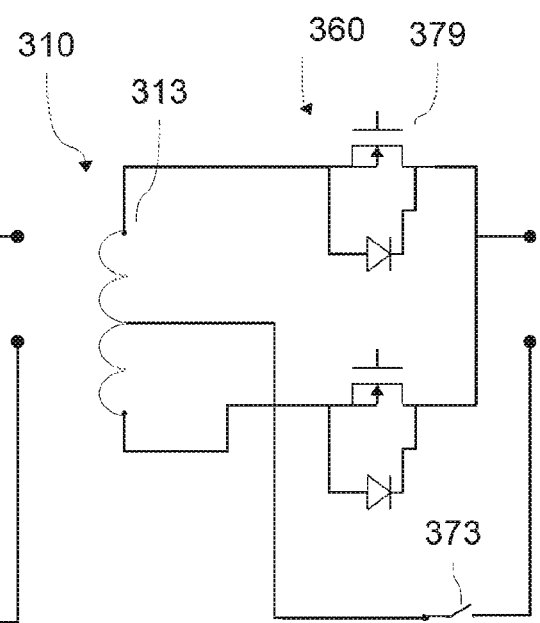
FIG. 10 is an electrical diagram of a third variant of a rectifier circuit connected to a secondary having a midpoint.

FIG. 10 is an electrical diagram of a variant of the AC/DC converter 300 shown in FIG. 8. This converter differs from the converter shown in FIG. 8 by the use of MOSFET switches 379 instead of the diodes 376.

Figure 11:
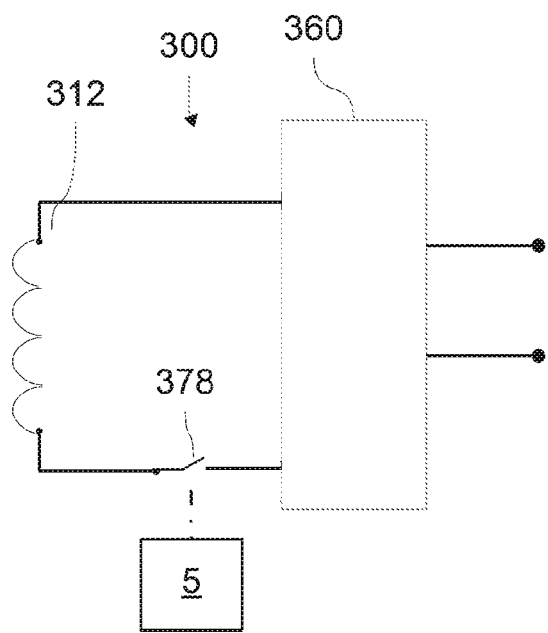
FIG. 11 is an electrical diagram of another variant of a rectifier circuit with selection by relays.

FIG. 11 is an electrical diagram of another variant of the AC/DC converter 300. In this example, the power supply of the output of the converter 300 is selectively interrupted via a relay 378 controlled by the control circuit 5. The relay 378 is thus configured to open selectively a connection with the input of the converter 300, upstream of the rectifier circuit 360.

Furthermore, in order to avoid charging current disparities between the different simultaneously charged stages 200, it is desirable for these stages 200 to have the same voltage. Consequently, the control circuit 5 can control the charging of the stages in the following manner.

The control circuit 5 is configured to determine at regular intervals which of the stages has/have the lowest voltage. The control circuit 5 then controls the charge of only the stage(s) which has/have been determined as having the lowest voltage. Within the scope of the invention, this strategy allows a high charging current to be applied to the stages that are clearly more discharged than the others. The balancing thus begins with the optimum charging of the accumulators that are most limiting for the overall capacity of the battery 2. Thus, even if the charge balancing time is limited, this operating mode allows the benefit of an optimum balancing efficiency. Furthermore, only stages having the same voltage level are then simultaneously charged. It is thus possible to benefit from a uniform distribution of the current between the stages that are being charged.

The control circuit 5 determines at regular intervals the state of charge of each of the stages 200. This state of charge may be determined through voltage measurement or may be extrapolated on the basis of the knowledge of the quantity of energy stored in each stage 200 during the charge balancing. The control circuit 5 may, for example, determine the charging energy by knowing the number of stages (and therefore the operating mode) charged simultaneously during given time periods. Such a determination of the state of charge is facilitated by the control strategy described above, since the stages being charged have the same voltage and simultaneously receive the same charging energy.

As described in detail above, it proves advantageous to have the same line impedances for the different AC/DC converters 300. Such a homogenization of the line impedance is relatively difficult to obtain for the battery 2. In fact, it proves impossible in practice to obtain an identical connection distance between the different stages and the transformer 310. Consequently, these distance differences cause dispersions between the line impedances. Similarly, the different outputs of the secondary 312 may have leakage inductances presenting dispersions.

Figure 12:
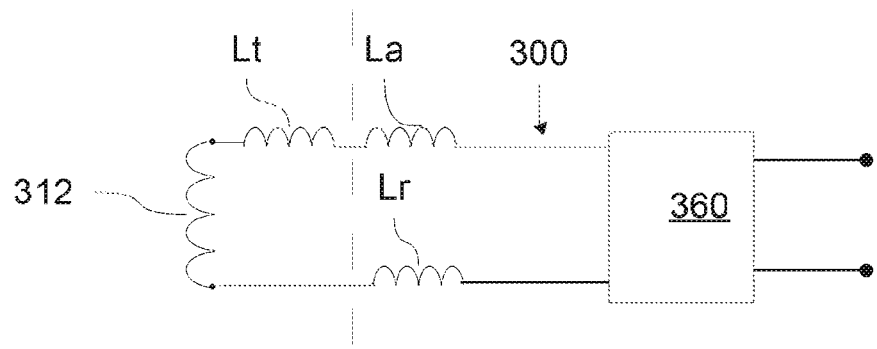
FIG. 12 is an electrical diagram showing the inductors on the side of an AC/DC converter.

FIG. 12 is an electrical diagram showing inductance values on the side of an AC/DC converter 300. Lt represents the leakage inductance of the output of the secondary 312 for this transformer. La represents the inductance produced by a first connection of the rectifier circuit 360 to a first output terminal of the secondary 312 for this transformer, and Lr represents the inductance produced by a second connection of the rectifier circuit 360 to the second output terminal of the secondary 312 for this transformer.

By denoting the leakage inductance in the secondary winding for an AC/DC converter with an index i as Lti, the connection inductances produced by the conducting elements between the rectifier circuit 360$i$ and this output as Lai and Lri, these conducting elements will be dimensioned for each AC/DC converter to verify the following relationship:

$$Lti + Lai + Lri = K, \text{ where } K \text{ is a constant.}$$

This relationship can be respected by measuring in advance the different values Lti and by adapting the values Lai and Lri by appropriate inductive connections or components.

It is conceivable, for example, to group the connections between the different AC/DC converters and the outputs of the secondary 312 on the same printed circuit. During the design, the width of the connecting tracks of the printed circuit is then adapted, as a function of their length, in order to obtain values Lai and Lri verifying the aforementioned relationship. The values Lai and Lri may include the inductance values of the previously described inductive elements 371 and 372.

It is desirable for the secondary circuits connected to each of the secondary elements to be the simplest, the most compact and the least expensive. A secondary circuit will designate all of the components and conductors connected between a stage and its respective secondary winding.

To avoid having to overdimension the secondary circuits, it is desirable to minimize the dispersions between these different secondary circuits. In fact, if the electrical behavior (the current delivered to a stage, the overvoltages in the parasitic elements, etc.) is variable from one circuit to another, it is necessary to provide a margin on the current or power delivered on the secondary winding in order not to exceed the maximum currents or voltages admissible by the components of the secondary circuit. These dispersions are typically due to the technological dispersions between the secondary circuits and to (relatively variable and sometimes poorly controlled) parasitic cabling inductances.

In order to limit the overdimensioning of the secondary circuits, including the secondary winding of the transformer, it is desirable to have a current in the secondary winding which reveals the smallest possible variations in order to guarantee a quasi-continuity of conduction in the secondary circuits. Thus, by using a full-wave rectifier, a desired mean current with lower peak current values is obtained. This choice is contrary to the conventional dimensioning desired by the person skilled in the art whereby, in order to supply only an amplitude of a few volts to a stage and with a large number of secondary circuits, a structure such as the flyback with a single winding per output and a single diode is generally preferred in order to limit the losses on the whole to the voltage drop in a diode and in order to limit the number of components that are used. A converter of this type, the flyback with a single winding and diode for each output, is opposed to the establishment of the current in the secondary circuit and interferes with the amplitude of this current. Conversely, the use of a full-wave rectifier according to the invention allows the transfer of energy between the capacitor and the inductor on the side of the series resonant circuit 340 to be optimized.

In the case of four rectifier elements with a secondary of the transformer connected as a bridge between these four rectifier elements, the leakage inductance of the secondary is completely integrated with the resonance inductance of the series resonant circuit 340, in contrast to the case of the midpoint rectification. In the case of the midpoint rectification, the presence of parasitic inductances on the secondary necessarily entails the use of switching-assistance circuits for the purpose of limiting overvoltages, improving the electromagnetic compatibility of the circuit and finally reducing the losses caused by the parasitic oscillations in the transformer. Such switching-assistance circuits being the source of additional switching losses, the increase in frequency is then more difficult than with the variants with four rectifier elements.

A charge balancing by charging of different stages can be implemented either during an overall charging phase or during an overall discharge phase.

Although not shown, the electrical power supply system 1 advantageously includes a device for measuring and monitoring the voltage on the terminals of the accumulator stages.

The invention claimed is:

1. A charge balancing device of an electrical energy power storage device including a plurality of series-connected electrical energy storage elements, the charge balancing device comprising:
   a DC/AC converter, including:
      an inverter including an input configured to be connected to a direct-voltage source;
      a series resonant circuit connected to the output of the inverter;
   a plurality of AC/DC converters each including an input and an output connected to one of the respective energy storage elements, each AC/DC converter selectively supplying its output with power, including a full-wave rectifier circuit, and being connected to a respective output of a secondary of a transformer via first and second conducting connections having respective inductances $L_{ai}$ and $L_{ri}$ for an AC/DC converter with an index i, leakage inductance of the secondary of the transformer for its output connected to the converter with an index i having a value $L_{ti}$, values of $L_{ti}$, $L_{ai}$ and $L_{ri}$ verifying the following relationship for each value of the index i: $L_{ti}+L_{ai}+L_{ri}=K$, where K is a constant;
   the transformer including a primary connected to the series resonant circuit and the secondary including secondary windings and outputs connected to terminals of respective secondary windings, each of these outputs being connected to an input of a respective of the AC/DC converter;
   a control circuit configured to control each AC/DC converter for the selective power supply of its output, and configured to control the DC/AC converter to supply a power $P_{cc}=act*P_{inc}$ to the primary of the transformer when a number of outputs act supplied with power by their AC/DC converter is less than or equal to a threshold, where $P_{inc}$ is a constant, and configured to control the DC/AC converter to supply a same constant power $P_{out}$ when the number of outputs act supplied with power by their AC/DC converter is greater than the threshold.

2. The charge balancing device as claimed in claim 1, wherein the series resonant circuit includes a capacitor and an inductor connected in series.

3. The charge balancing device as claimed in claim 1, wherein each of the AC/DC converters includes an inductor connected in one of the conducting connections between the input of this AC/DC converter and its rectifier circuit.

4. The charge balancing device as claimed in claim 3, wherein the control circuit is configured to determine which energy storage element has a lowest voltage, and configured to control the power supply of an output by its AC/DC converter only when it has been determined that the energy storage element connected to this output has the lowest voltage.

5. The charge balancing device as claimed in claim 3, wherein the control circuit determines a state of charge of each of the storage elements on the basis of a power supply time of the output connected to each storage element, when the DC/AC converter is controlled at constant power, and when this DC/AC converter is controlled at a current source.

6. The charge balancing device as claimed in claim 1, wherein each of the AC/DC converters includes four rectifier elements and the output of the secondary of the transformer is connected as a bridge between the four rectifier elements.

7. The charge balancing device as claimed in claim 1, wherein the secondary of the transformer comprises a secondary winding at the midpoint for each of the AC/DC converters, and each of the AC/DC converters includes first and second rectifier elements connected to a terminal of their storage element and to a respective terminal of their secondary winding, the midpoint of the secondary winding being connected to the other terminal of their storage element.

8. The charge balancing device as claimed in claim 1, wherein each of the AC/DC converters includes a switch controlled by the control circuit to connect selectively the output of the AC/DC converter to its respective storage element.

9. The charge balancing device as claimed in claim 1, wherein each of the AC/DC converters includes a rectifier element and a relay controlled by the control circuit, the relay selectively connecting the secondary of the transformer to the rectifier element.

10. The charge balancing device as claimed in claim 1, wherein the inverter is dimensioned for an input voltage lower than voltage on terminals of the electrical power storage device.

* * * * *